United States Patent
Gennard et al.

(10) Patent No.: US 8,601,453 B2
(45) Date of Patent: *Dec. 3, 2013

(54) COBOL TO BYTECODE TRANSLATION

(75) Inventors: Stephen Gennard, Hungerford (GB); Robert Sales, Newbury (GB); Alex Turner, Yarnton (GB); Jeremy Wright, Newbury (GB)

(73) Assignee: Micro Focus (US), Inc., Rockville, MD (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/236,578

(22) Filed: Sep. 19, 2011

(65) Prior Publication Data

US 2012/0151457 A1 Jun. 14, 2012

Related U.S. Application Data

(60) Provisional application No. 61/384,310, filed on Sep. 19, 2010, provisional application No. 61/384,668, filed on Sep. 20, 2010.

(51) Int. Cl.
*G06F 9/45* (2006.01)
(52) U.S. Cl.
USPC .................................. 717/146; 717/140
(58) Field of Classification Search
USPC ................................................ 717/136–161
See application file for complete search history.

(56) References Cited

U.S. PATENT DOCUMENTS

| | | | |
|---|---|---|---|
| 4,567,574 A * | 1/1986 | Saade et al. .................. | 717/155 |
| 5,778,232 A | 7/1998 | Caldwell et al. | |
| 6,453,464 B1 | 9/2002 | Sullivan | |
| 6,523,171 B1 * | 2/2003 | Dupuy et al. .................. | 717/136 |
| 7,386,840 B1 * | 6/2008 | Cockerham et al. .......... | 717/137 |
| 8,370,820 B2 * | 2/2013 | Guenthner et al. ........... | 717/149 |
| 8,438,551 B2 * | 5/2013 | Tonkin et al. ................ | 717/144 |
| 2006/0031820 A1 * | 2/2006 | Li ................................. | 717/137 |
| 2009/0064091 A1 * | 3/2009 | Tonkin et al. ................ | 717/104 |
| 2011/0093837 A1 * | 4/2011 | Guenthner et al. ........... | 717/149 |

OTHER PUBLICATIONS

"Procedure Division—Perform—Rollback," <http://supportline.microfocus.com/Documentation/books/nx30books/lrpdfb.htm>, 1998, p. 1-27.*
Field et al., "Identifying Procedural Structure in Cobol Programs," Sep. 1999, ACM, p. 1-10.*
Mossienko, Maxim, "Automated Cobol to Java Recycling," 2003, IEEE.*
Suganuma et al., "Performance Pitfalls in Large-Scale Java Applications Translated from COBOL," Oct. 2008, ACM, p. 685-696.*
U.S. Appl. No. 13/236,574.

* cited by examiner

*Primary Examiner* — Qing Chen
(74) *Attorney, Agent, or Firm* — DLA Piper LLP US

(57) ABSTRACT

A system that translates source code of a compiled high level language into bytecode. Compiled languages are so named because their implementations are typically compilers that generate machine code. The described system takes source code of the compiled high level language and translates it into bytecode. The bytecode can be optimized with control flow analysis and method splitting.

7 Claims, 7 Drawing Sheets

COBOL TO BYTECODE TRANSLATION

CROSS REFERENCE TO RELATED APPLICATIONS

This application claims the benefit U.S. Provisional Application No. 61/384,310, entitled "Perform Analysis and Method Splitting in COBOL-Sourced Programs for Conversion to Object-Oriented Program Structures" and filed on Sep. 19, 2010, and U.S. Provisional Application No. 61/384,668, entitled "Perform Analysis and Method Splitting in COBOL-Sourced Programs for Conversion to Object-Oriented Program Structures" and filed on Sep. 20, 2010, all of which are incorporate herein by reference for all purposes.

FIELD

The present invention relates generally to software. More specifically, the present invention relates to COBOL translation to lower level languages.

BACKGROUND

COBOL, an acronym for COmmon Business-Oriented Language, is one of the oldest programming languages. COBOL is still used in business, finance and administrative systems and is continuously evolving with revisions and dialects. In 2002 the fourth revision of COBOL introduced object-orientation, bit and Boolean support, floating point support, and many other features.

In order to function on a computer, human-readable source code (such as programs written in COBOL) must be translated into a computer-readable binary form called object code. Traditionally, compilers, interpreters or just-in-time ("JIT") compilers would accomplish the task of translating instructions written in a high level programming language to a lower level language. Although the distinctions are not perfectly clear, generally compilers make the translation just once and store the object code for repeated use, interpreters translate the source code for every execution, and JIT compilers represent a hybrid approach, with both continuously translating and caching the translated code. COBOL is described as a complied language, meaning neither interpreters nor JIT compilers are used to execute COBOL source code.

The desire to achieve greater portability led to the development of bytecodes—compact numeric codes that denote instruction sets. Bytecodes are designed for efficient execution by an interpreter or a JIT compiler, as well as being suitable for compilation. They are lower level than source code, but not the lowest level of object code, representing an intermediate translation. The environment (such as a Java™ Virtual Machine or a .NET Framework) makes the final step of translating the bytecode to object code, introducing hardware and operating system dependence. The Java™ specification was developed by Sun Microsystems™, now a division of Oracle™. The .NET Framework is a software framework developed by Microsoft™ for Windows™ operating systems.

When portability of COBOL is desired, prior solutions, such as those described by U.S. Pat. No. 6,453,464 to Sullivan, hereby incorporated by reference in its entirety for all purposes, use templates to translate high-level COBOL source code into high-level Java source code.

There are continuing efforts to improve translations.

BRIEF DESCRIPTION OF THE DRAWINGS

The present invention will be readily understood by the following detailed description in conjunction with the accompanying drawings. Like reference numerals designate like structural elements. Although the drawings depict various examples of the invention, the invention is not limited by the depicted examples. Furthermore, the depictions are not necessarily to scale.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. In other examples, the described techniques may be varied in design, architecture, code structure, or other aspects and are not limited to any of the examples provided. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, HTML, DHTML, XHTML, HTTP, XMPP, PHP, and others. The described techniques may be varied and are not limited to the embodiments, examples or descriptions provided.

Figure 1:
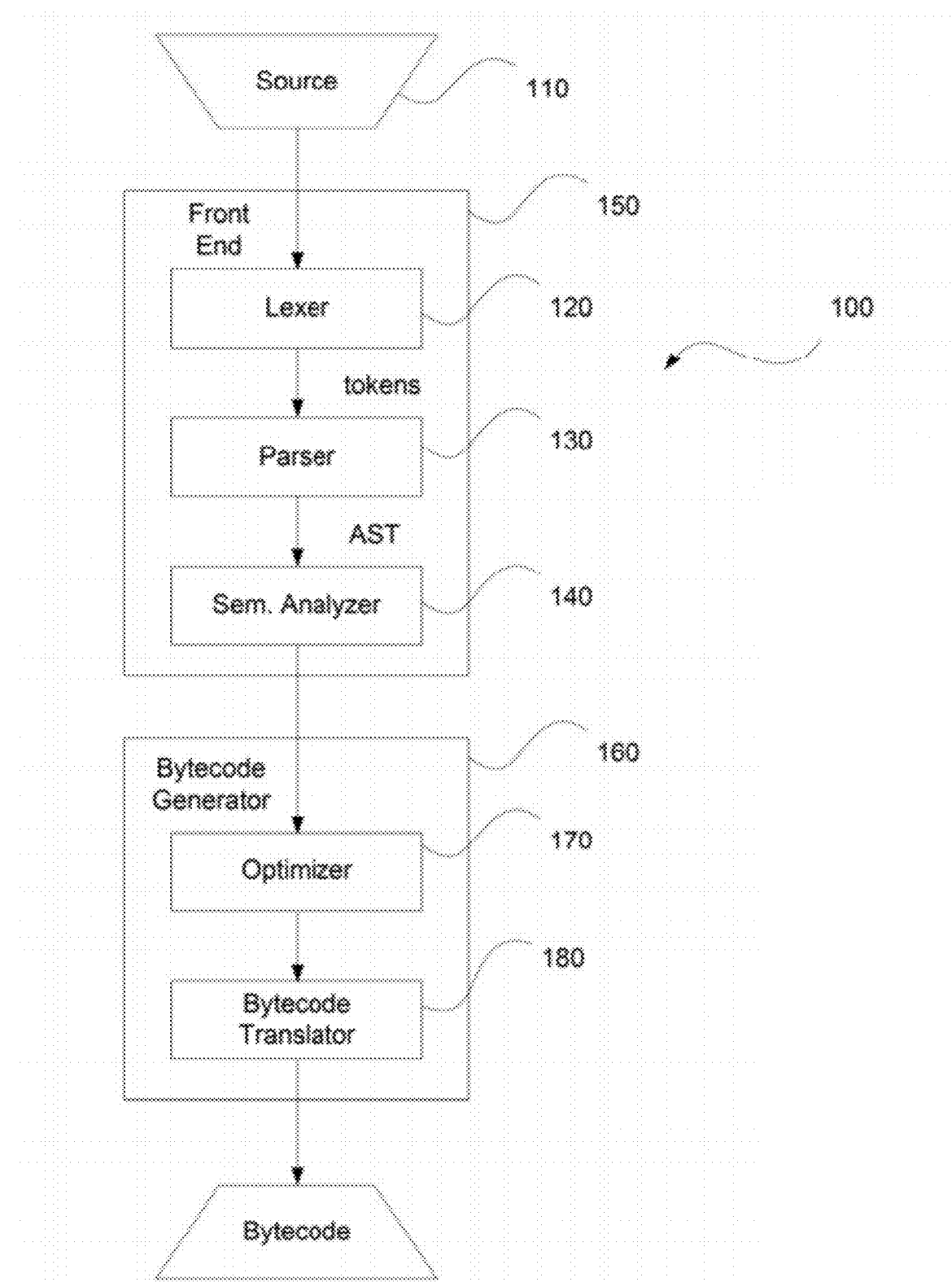
FIG. 1 illustrates an exemplary compiler that translates a compiled high level language into bytecode.

FIG. 1 illustrates an exemplary compiler 100 that translates a compiled high level language into bytecode. COBOL is an example of a compiled high level language and Java bytecode is a specific type of bytecode. Source code 110 is input into the compiler 100 and then subject to lexical analysis by lexer 120. Lexer 120 converts the characters of the source code 110 into a sequence of tokens, a string of characters categorized according to various rules. For example, a string of characters might be identified as a number, a mathematical operator, or an end statement.

Once the source code 110 is tokenized, the parser 130 conducts syntax analysis, parsing the token sequence to identify the syntactic structure of the program and building the abstract syntax tree ("AST"). The AST is built according to the formal grammar rules of the language, with each node of the tree denoting a construct occurring in the source code.

The semantic analyzer 140 refines the AST and builds a symbol table. In this phase semantic checks such as type checking (checking for type errors), object binding (associating variable and function references with their definitions), and definite assignment (requiring all local variables to be initialized before use).

Together, the lexer 120, parser 130 and semantic analyzer 140 make up the front end 150, converting source code into first a parse tree (sometimes called a concrete syntax tree) and then into an AST.

The optimizer 170 and bytecode translator 180 perform the functions of the bytecode generator 160 and translate the AST into bytecode. Generally, the optimizer will perform optimizations, either directly upon the AST or via some other intermediate format, and the bytecode translator performs functions of instruction selection.

The bytecode generator 160 additionally performs control flow analysis and method splitting. Control flow analysis is used to transform poorly behaved programs into well structured programs, and is described in copending application entitled "Control Flow Analysis Methods and Computing Devices for Converting COBOL-Sourced Programs to Object-Oriented Program Structures," filed on date even herewith, hereby incorporated by reference for all purposes. The copending application describes analyzing code to determine flow-affected code and optimizing the flow-affected code. As an example, if COBOL is used then overlapping PERFORM ranges can be identified and resolved.

Figures 2A, 2B:
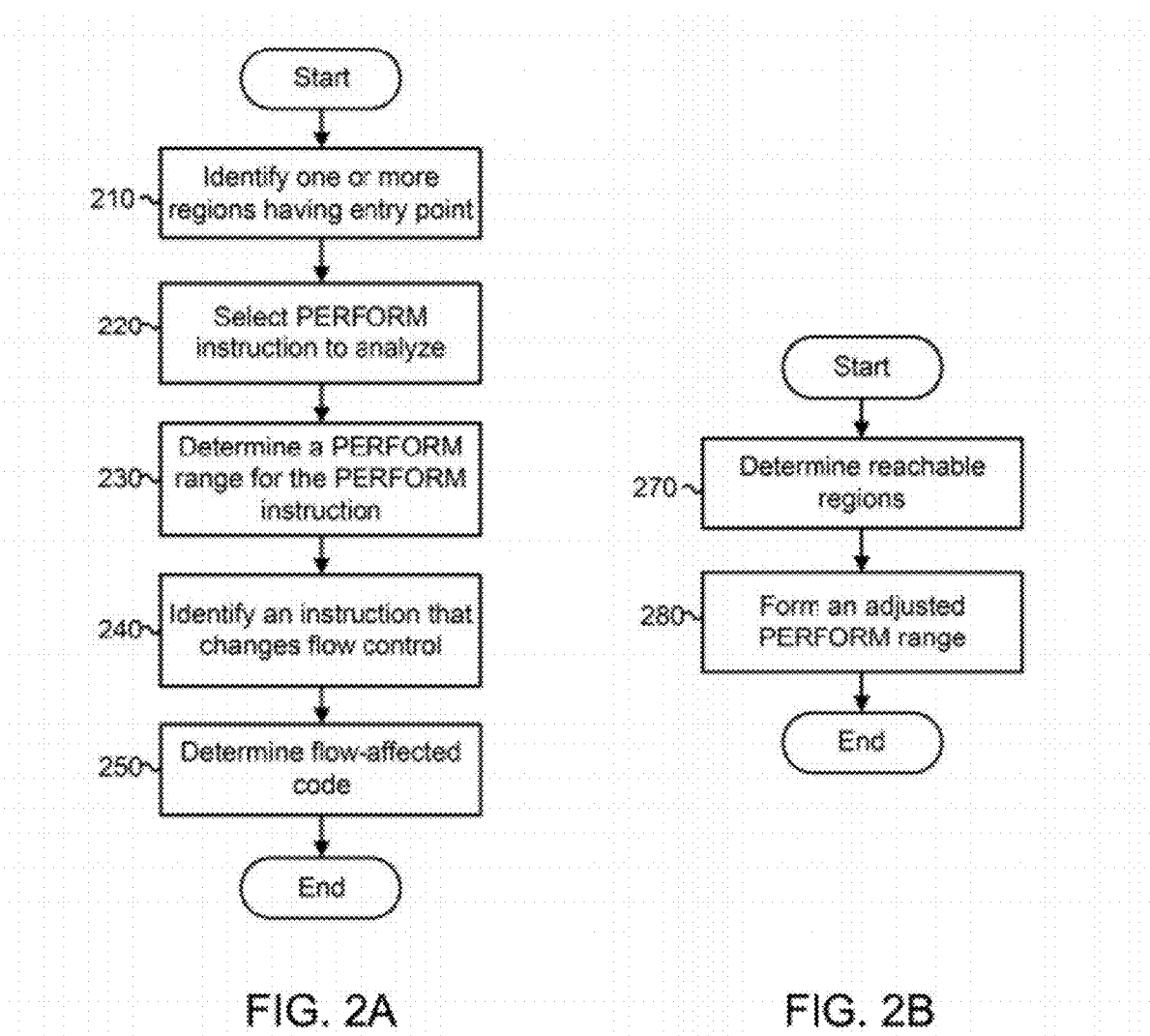
FIG. 2A illustrates an exemplary flowchart for identifying a portion of flow-affected code.
FIG. 2B illustrates an exemplary flowchart for resolving the portion of flow-affected code.

FIG. 2A illustrates an exemplary flowchart for identifying a portion of flow-affected code in accordance with a method described in the copending application. Those skilled in the art will appreciate that the "code" can either be the source code itself, an internal representation of the source code (e.g., a syntax tree) or even preliminary bytecode. Accordingly, a PERFORM instruction, such as one present in step 220, can either be referring to an instruction in either the source code or some internal representation of the source code. In step 210 one or more regions of code having an entry point is identified. In step 220 a PERFORM instruction associated with the entry point is selected. In step 230 a PERFORM range for the PERFORM instruction is determined. In step 240 an instruction that changes control flow in execution of the code subsequent to the PERFORM instruction is identified. In step 250 the flow-affected code resulting from the instruction is determined.

FIG. 2B illustrates an exemplary flowchart for resolving the portion of flow-affected code in accordance with a method described in the copending application. In step 270 the overlapping PERFORM ranges are resolved by determining reachable regions. In step 280 an adjusted PERFORM range for the PERFORM instruction based on the reachable regions is formed.

Method splitting converts large sections of code ("methods") into several smaller sections of code. Those skilled in the art understand that many small methods are more appropriate for SIT compilation than few large methods. Additionally, certain bytecode translators have size limitations. For example the Java Virtual Machine (JVM) has a 64 k limit for any given method. Method splitting is described in copending application entitled "Computer Code Optimization Through Method Splitting," filed on date even herewith, hereby incorporated by reference for all purposes.

Figure 3:
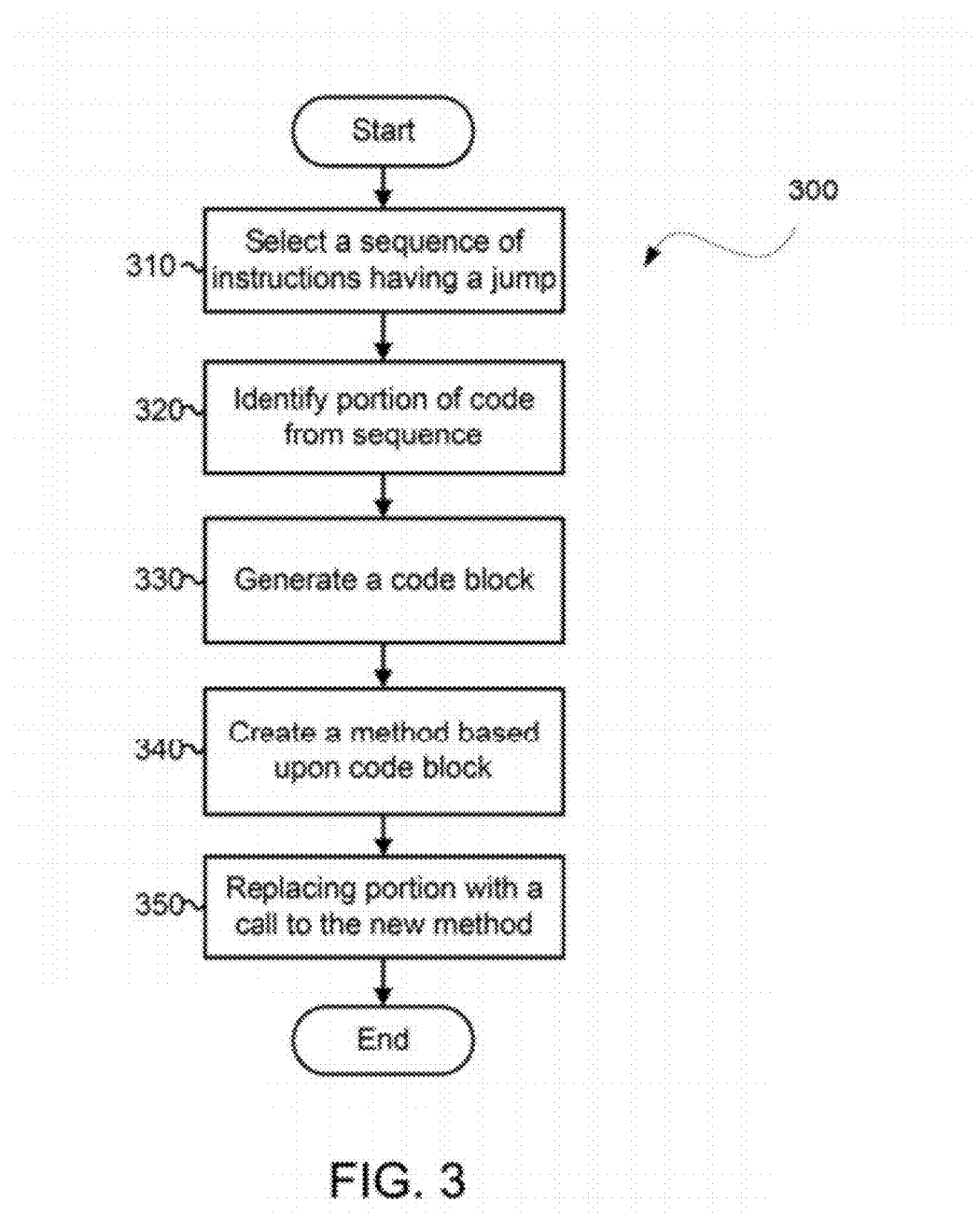
FIG. 3 illustrates an exemplary flowchart for method splitting.

FIG. 3 illustrates an exemplary flowchart for method splitting in accordance with a method described in the copending application. As described previously, "code" can be the source code, an internal representation of the source code, or translated bytecode. In step 310 a sequence of instructions with a jump instruction is selected from the code. A jump instruction alters the order of execution of the sequence of instructions. In step 320 a portion of the code based upon the jump instruction is identified. In step 330 a code block storing a start point for the portion and an end point for the portion is generated. In step 340 a new method based upon the code block is created. In step 350 a call associated with the new method replaces the portion of code.

Figure 4:
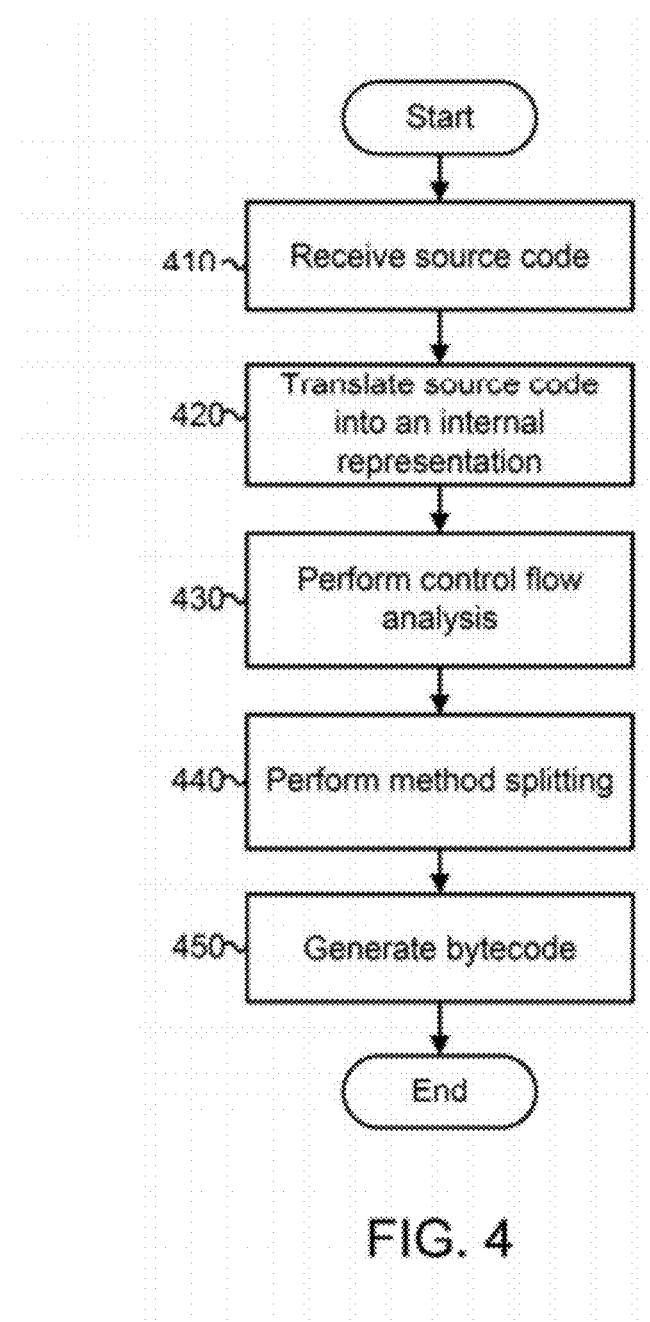
FIG. 4 illustrates an exemplary flowchart of the exemplary compiler from FIG. 1 converting source code into bytecode.

FIG. 4 illustrates an exemplary flowchart of the exemplary compiler 100 converting source code into bytecode. In step 410 the source code 110 is input into the compiler's front end 150. In step 420 the front end 150 translates the source code 110 into an internal representation, such as a syntax tree. In step 430 the bytecode generator 160 performs control flow analysis on the code. In step 440 the bytecode generator 160 performs method splitting on the code. In step 450, the internal representation is translated into bytecode.

Figure 5:
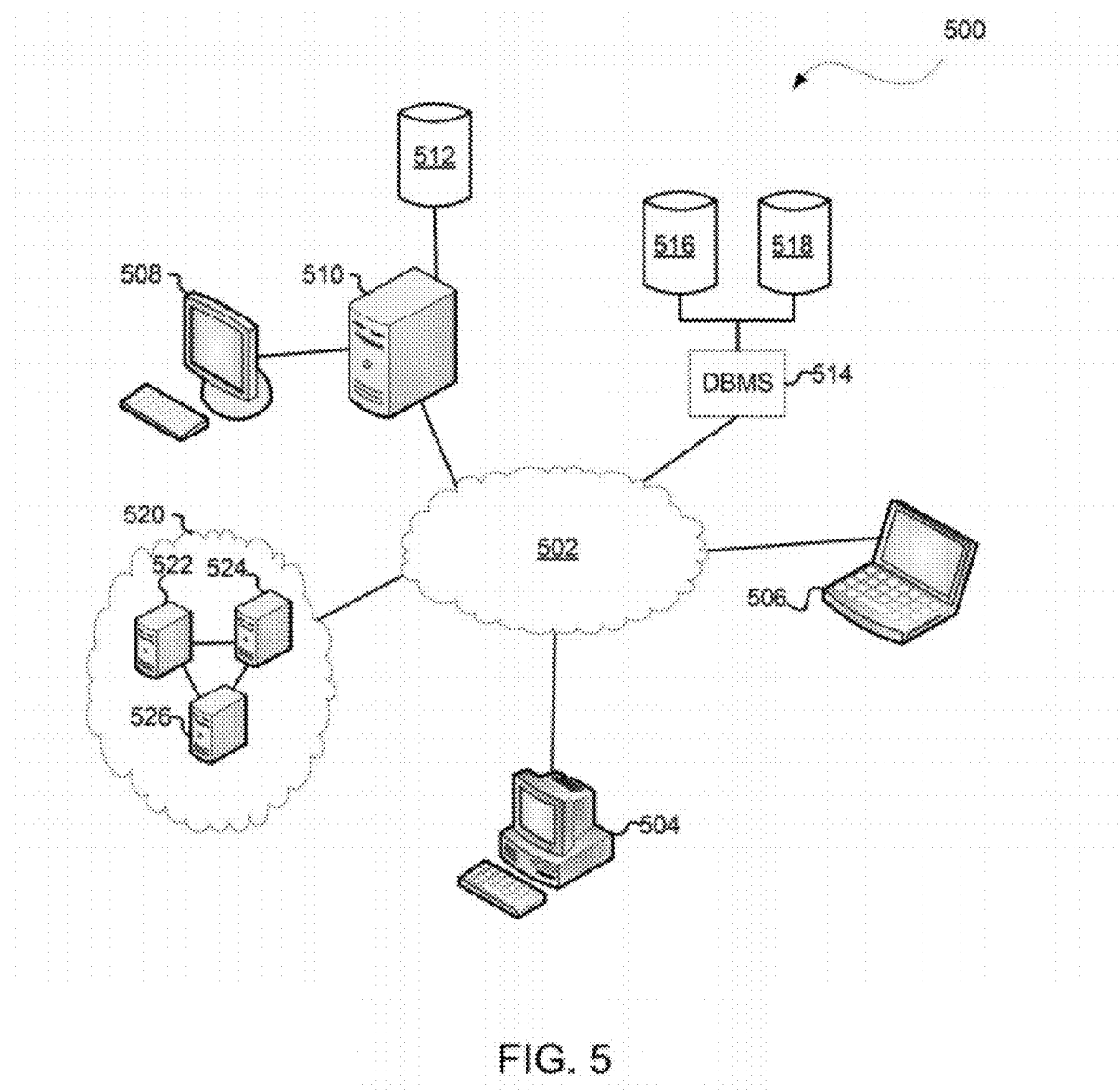
FIG. 5 illustrates an exemplary system for implementing a compiler that translates source code of a compiled high level language into bytecode.

FIG. 5 illustrates an exemplary system for implementing a compiler that translates source code of a compiled high level language into bytecode, according to some embodiments. Here, system 500 includes network 502, clients 504-510, database 512, database management system (DBMS) 514, networked storage 516-518, and computing cloud 520 including processors 522-526. In some examples, system 500 may be used completely or partially to implement the techniques described. However, the described techniques are not limited to any given topology or system architecture and the elements shown may be varied in design, layout, structure, architecture, functionality, or other aspects and are not limited to the examples shown and described.

Figure 6:
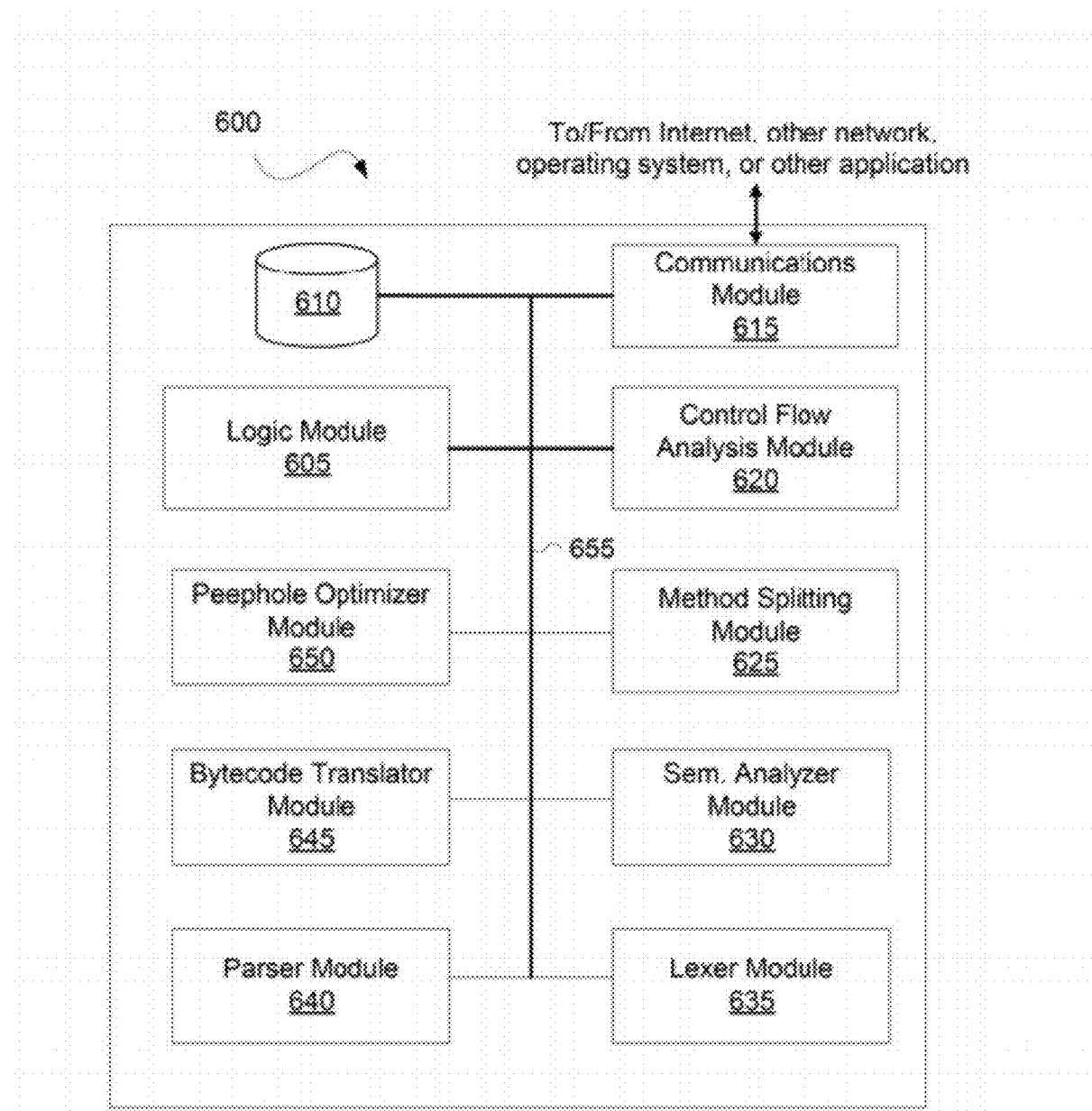
FIG. 6 illustrates an exemplary application architecture for implementing a compiler that translates source code of a compiled high level language into bytecode.

FIG. 6 illustrates an exemplary application architecture for implementing a compiler that translates source code of a compiled high level language into bytecode. Here, application 600 includes logic module 605, storage 610, communications module 615, a control flow analysis module 620, a method splitting module 625, a semantic analyzer module 630, a lexer module 635, a parser module 640, a bytecode translator module 645, and a peephole optimizer module 650. Each of the above-described modules may be implemented using software, hardware, firmware, circuitry, or a combination thereof. The described techniques for translating a complied high level language into bytecode may be implemented using this exemplary application architecture. In other examples, the exemplary application architecture may be varied and is not limited to the examples shown and described, which may including modifying the type, quantity, configuration, instantiation, design, structure, or any other aspects of the elements and modules shown.

Figure 7:
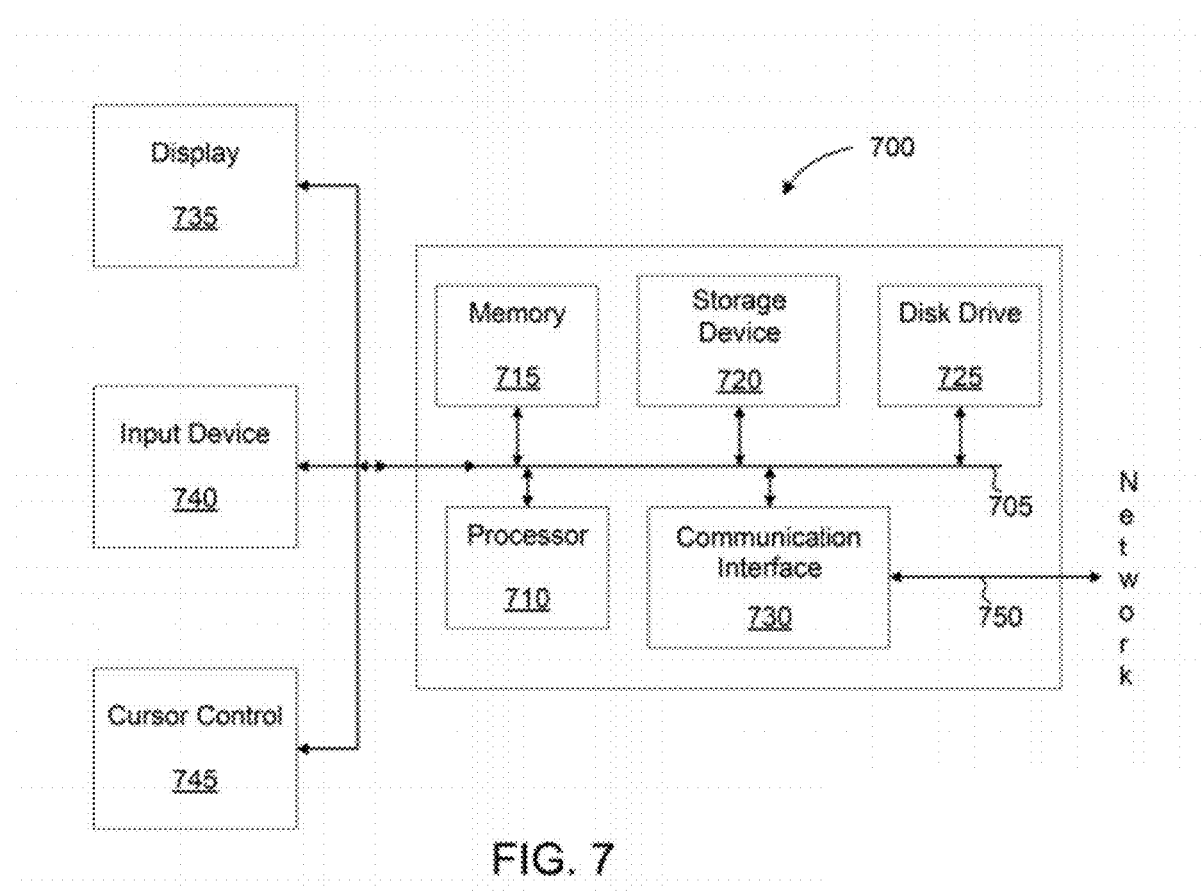
FIG. 7 illustrates an exemplary computer system suitable for implementing the structures and functionalities of FIG. 6.

FIG. 7 illustrates an exemplary computer system suitable for implementing the above-identified structures and/or functionalities to facilitate translation of source code of a compiled high level language into bytecode. In some examples, computer system 700 may be used to implement computer programs, applications, methods, processes, or other software to perform the above-described techniques. Computer system 700 includes a bus 705 or other communication mechanism for communicating information, which interconnects subsystems and devices, such as processor 710, system memory 715 (e.g., RAM), storage device 720 (e.g., ROM), disk drive 725 (e.g., magnetic or optical), communication interface 730 (e.g., modem or Ethernet card), display 735 (e.g., CRT or LCD), input device 740 (e.g., keyboard), and cursor control 745 (e.g., mouse or trackball). According to some examples, computer system 700 performs specific operations by processor 710 (which may include a plurality of processors) executing one or more sequences of one or more instructions stored in system memory 715. Such instructions may be read into system memory 715 from another computer readable medium, such as static storage device 720 or disk drive 725. In some examples, hard-wired circuitry may be used in place of or in combination with software instructions for implementation.

The term "computer readable medium" refers to any tangible medium that participates in providing instructions to processor 710 for execution. Such a medium may take many forms, including but not limited to, non-volatile media and volatile media. Non-volatile media includes, for example, optical or magnetic disks, such as disk drive 725. Volatile media includes dynamic memory, such as system memory 715. In some examples, a single apparatus (i.e., device, machine, system, or the like) may include both flash and hard disk-based storage facilities (e.g., solid state drives (SSD), hard disk drives (HDD), or others). In other examples, multiple, disparate (i.e., separate) storage facilities in different apparatus may be used. Further, the techniques described herein may be used with any type of digital memory without limitation or restriction. The described techniques may be varied and are not limited to the examples or descriptions provided. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 705 for transmitting a computer data signal. In some examples, execution of the sequences of instructions may be performed by a single computer system 700. According to some examples, two or more computer systems 700 coupled by communication link 750 (e.g., LAN, PSTN, or wireless network) may perform the sequence of instructions in coordination with one another. Computer system 700 may transmit and receive messages, data, and instructions, including program, i.e., application code, through communication link 750 and communication interface 730. Received program code may be executed by processor 710 as it is received, and/or stored in disk drive 725, or other non-volatile storage for later execution.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A system comprising:
    a processor; and
    a memory, wherein the memory stores a compiler that translates source code of a compiled high level language into bytecode, and wherein the compiler comprises:
        a front end that analyzes the source code to build an internal representation of the source code; and
        a bytecode generator that translates the internal representation into bytecode, wherein the bytecode is not machine code and requires further processing in order to be executed, wherein the bytecode generator performs control flow analysis by detecting and optimizing flow-affected code, wherein the compiled high level language is COBOL, wherein the flow-affected code includes overlapping PERFORM ranges, wherein the optimizing is accomplished through resolving the overlapping PERFORM ranges, and wherein the overlapping PERFORM ranges are detected by:
            identifying one or more regions having an entry point;
            selecting a PERFORM instruction associated with the entry point to analyze;
            determining a PERFORM range for the selected PERFORM instruction;
            identifying an instruction that changes control flow subsequent to the selected PERFORM instruction; and
            determining flow-affected code resulting from the instruction, wherein the overlapping PERFORM ranges are resolved by determining reachable regions and forming an adjusted PERFORM range for the selected PERFORM instruction based on the determined reachable regions.

2. The system of claim 1, wherein the further processing is performed by a virtual machine.

3. The system of claim 1, wherein the internal representation is a syntax tree.

4. The system of claim 1, wherein the bytecode generator performs method splitting by converting a section of code into multiple smaller sections of code.

5. The system of claim 4, wherein the conversion is accomplished by:
    selecting a sequence of instructions from code, wherein the sequence of instructions have a jump instruction being configured to alter an order of execution of the sequence of instructions;
    identifying a portion of the code from the sequence of instructions based upon the jump instruction;
    generating a code block based upon the portion of the code, wherein the code block stores a start point for the portion of the code and an end point for the portion of the code;
    creating another method based upon the code block; and
    replacing the portion of the code with a call associated with the another method.

6. A method comprising:
    receiving source code from a compiled high level language;

translating the source code into an internal representation;
optimizing the internal representation by performing control flow analysis on the internal representation by detecting and optimizing flow-affected code, wherein the compiled high level language is COBOL, wherein the flow-affected code includes overlapping PERFORM ranges, wherein the optimizing is accomplished through resolving the overlapping PERFORM ranges, and wherein the overlapping PERFORM ranges are detected by:
   identifying one or more regions having an entry point;
   selecting a PERFORM instruction associated with the entry point to analyze;
   determining a PERFORM range for the selected PERFORM instruction;
   identifying an instruction that changes control flow subsequent to the selected PERFORM instruction; and
   determining flow-affected code resulting from the instruction, wherein the overlapping PERFORM ranges are resolved by determining reachable regions and forming an adjusted PERFORM range for the selected PERFORM instruction based on the determined reachable regions;
splitting the optimized internal representation by converting a section of the optimized internal representation into multiple smaller sections; and
generating bytecode from the multiple smaller sections.

7. A computer program product embodied in a non-transitory computer readable medium and comprising computer instructions configured to:

receive source code from a compiled high level language;
translate the source code into an internal representation;
optimize the internal representation by performing control flow analysis on the internal representation by detecting and optimizing flow-affected code, wherein the compiled high level language is COBOL, wherein the flow-affected code includes overlapping PERFORM ranges, wherein the optimizing is accomplished through resolving the overlapping PERFORM ranges, and wherein the overlapping PERFORM ranges are detected by:
   identifying one or more regions having an entry point;
   selecting a PERFORM instruction associated with the entry point to analyze;
   determining a PERFORM range for the selected PERFORM instruction;
   identifying an instruction that changes control flow subsequent to the selected PERFORM instruction; and
   determining flow-affected code resulting from the instruction, wherein the overlapping PERFORM ranges are resolved by determining reachable regions and forming an adjusted PERFORM range for the selected PERFORM instruction based on the determined reachable regions;
split the optimized internal representation by converting a section of the optimized internal representation into multiple smaller sections; and
generate bytecode from the multiple smaller sections.

\* \* \* \* \*